United States Patent
Moran et al.

(10) Patent No.: US 10,365,816 B2
(45) Date of Patent: Jul. 30, 2019

(54) MEDIA CONTENT INCLUDING A PERCEPTUAL PROPERTY AND/OR A CONTEXTUAL PROPERTY

(71) Applicants: Amit Moran, Tel Aviv (IL); Gila Kamhi, Zichron Yaakov (IL); Ron Ferens, Ramat Hasharon (IL); Barak Hurwitz, Kibbutz Alonim (IL); Kobi Nistel, Haifa (IL); Nadav Zamir, Raanana (IL)

(72) Inventors: Amit Moran, Tel Aviv (IL); Gila Kamhi, Zichron Yaakov (IL); Ron Ferens, Ramat Hasharon (IL); Barak Hurwitz, Kibbutz Alonim (IL); Kobi Nistel, Haifa (IL); Nadav Zamir, Raanana (IL)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 14/124,783

(22) PCT Filed: Aug. 21, 2013

(86) PCT No.: PCT/US2013/056003
§ 371 (c)(1),
(2) Date: Dec. 9, 2013

(87) PCT Pub. No.: WO2015/026338
PCT Pub. Date: Feb. 26, 2015

(65) Prior Publication Data
US 2015/0058764 A1 Feb. 26, 2015

(51) Int. Cl.
*G06F 3/0486* (2013.01)
*G06F 3/0484* (2013.01)
(Continued)

(52) U.S. Cl.
CPC .......... *G06F 3/0486* (2013.01); *G06F 3/0481* (2013.01); *G06F 3/0482* (2013.01);
(Continued)

(58) Field of Classification Search
CPC .. G06F 17/218; G06F 3/0484; G06F 3/04847; G06F 3/04842; G06F 3/0486;
(Continued)

(56) References Cited

U.S. PATENT DOCUMENTS 5,898,423 A * 4/1999 Tognazzini ............. G06F 3/013
345/158
8,166,394 B1 4/2012 Melnicki
(Continued)

FOREIGN PATENT DOCUMENTS

KR 10-2012-0108550 A 10/2012

OTHER PUBLICATIONS

Little Heroes Press Releases [online], Little Heroes Personalized Kids Books, 2009 [retrieved on Oct. 27, 2017], Retrieved from the Internet: <URL: https://www.littleheroes.com/press-releases/>.*
(Continued)

*Primary Examiner* — Tuyetlien T Tran
(74) *Attorney, Agent, or Firm* — Jordan IP Law, LLC (57) ABSTRACT

Apparatuses, systems, media and/or methods may involve creating content. A property component may be added to a media object to impart one or more of a perceptual property or a contextual property to the media object. The property component may be added responsive to an operation by a user that is independent of a direct access by the user to computer source code. An event corresponding to the property component may be mapped with an action for the media object. The event may be mapped with the action responsive to an operation by a user that is independent of a direct access by the user to computer source code. A graphical user
(Continued)

interface may be rendered to create the content. In addition, the media object may be modified based on the action in response to the event when content created including the media object is utilized.

19 Claims, 5 Drawing Sheets

(51) Int. Cl.

| | | |
|---|---|---|
| *G06T 11/60* | (2006.01) | |
| *G06F 3/0482* | (2013.01) | |
| *G06F 3/0481* | (2013.01) | |
| *G06F 3/0488* | (2013.01) | |
| *G06F 16/48* | (2019.01) | |
| *G06Q 10/10* | (2012.01) | |
| *G11B 27/034* | (2006.01) | |
| *G11B 27/031* | (2006.01) | |
| *G06F 16/438* | (2019.01) | |

(52) U.S. Cl.
CPC .......... *G06F 3/0484* (2013.01); *G06F 3/0488* (2013.01); *G06F 3/04842* (2013.01); *G06F 16/48* (2019.01); *G06T 11/60* (2013.01); *G06F 16/4393* (2019.01); *G06Q 10/10* (2013.01); *G06T 2200/24* (2013.01); *G06T 2207/20221* (2013.01); *G11B 27/031* (2013.01); *G11B 27/034* (2013.01)

(58) Field of Classification Search
CPC ... G06F 3/0481; G06F 3/0482; G11B 27/031; G06T 2200/24; G06T 2207/20221; G06T 11/60
USPC .................................................. 715/706, 765
See application file for complete search history.

(56) References Cited

U.S. PATENT DOCUMENTS

| | | | |
|---|---|---|---|
| 9,275,056 B2 | 3/2016 | Amacker | |
| 2002/0005865 A1 | 1/2002 | Hayes-Roth | |
| 2005/0273722 A1* | 12/2005 | Robb | G06Q 30/00 715/764 |
| 2007/0185909 A1* | 8/2007 | Klein | A63F 13/10 |
| 2009/0158147 A1* | 6/2009 | Amacker | G06F 17/30058 715/700 |
| 2013/0042169 A1* | 2/2013 | Reedy | G06Q 50/01 715/202 |
| 2013/0205202 A1 | 8/2013 | Xiao et al. | |
| 2014/0040039 A1* | 2/2014 | Gates, III | G06Q 30/0269 705/14.66 |

OTHER PUBLICATIONS

International Search Report and Written Opinion received for PCT Patent Application No. PCT/US2013/056003, dated May 15, 2014, 12 pages.

International Preliminary Report on Patentability for International Patent Application PCT/US2013/056003, dated Mar. 3, 2016, 9 pages.

* cited by examiner

MEDIA CONTENT INCLUDING A PERCEPTUAL PROPERTY AND/OR A CONTEXTUAL PROPERTY

BACKGROUND

Embodiments generally relate to media content. More particularly, embodiments relate to creating media content including a media object having a perceptual property and/or a contextual property via, for example, a graphical user interface. The media object may be modified based on an action in response to an event when content created including the media object is utilized.

A content creation platform (e.g., a content development tool) may be utilized to create media content, wherein a user may add an object to the media content and may define a functional property for the object such as color. However, the object (and consequently the media content) may appear and/or function the same irrespective of a user state and/or a content utilization context. Therefore, the satisfaction of a user creating the media content and/or of a user utilizing the media content may be minimized. In addition, the development of perceptual computing media content may require significant customization and/or programming knowledge. For example, a developer may be required to possess specific knowledge of available perceptual computing and/or computer vision libraries including image sensor interfaces such as PerC SDK (Perceptual Computing Software Development Kit), Open NI (Open Naturation Interaction), OpenCV (Open Source Computer Vision Library), and so on. As a result, there may be a limit to the widespread implementation of perceptual computing media.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1A:
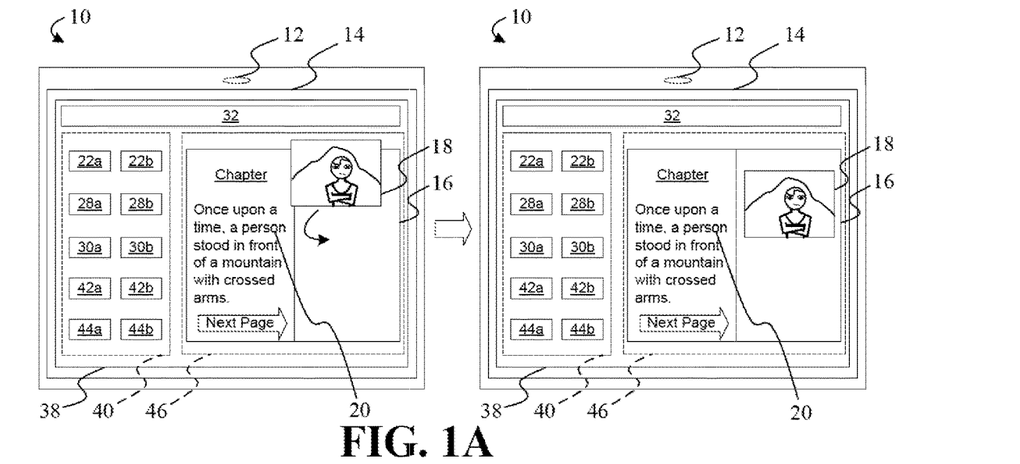
FIGS. 1A to 1C are block diagrams of examples of an apparatus to create media content according to an embodiment.
Figure 1B:
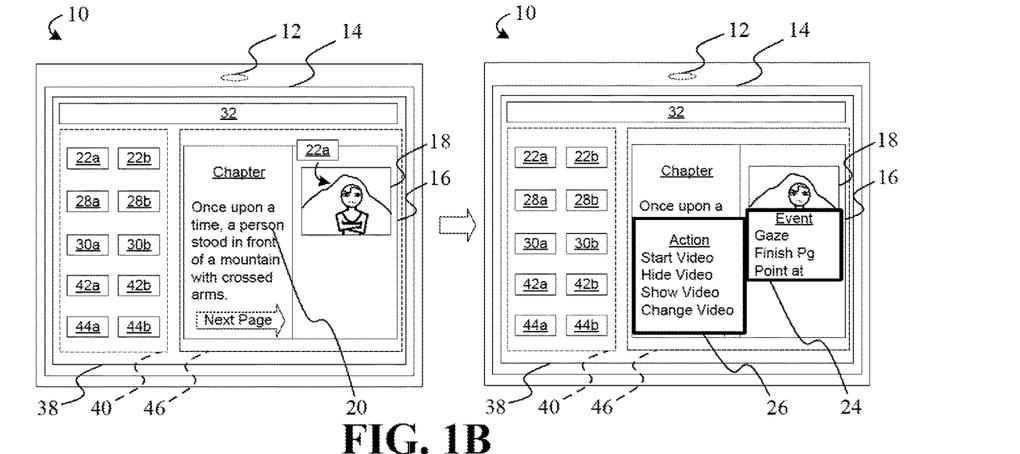
Figure 1C:
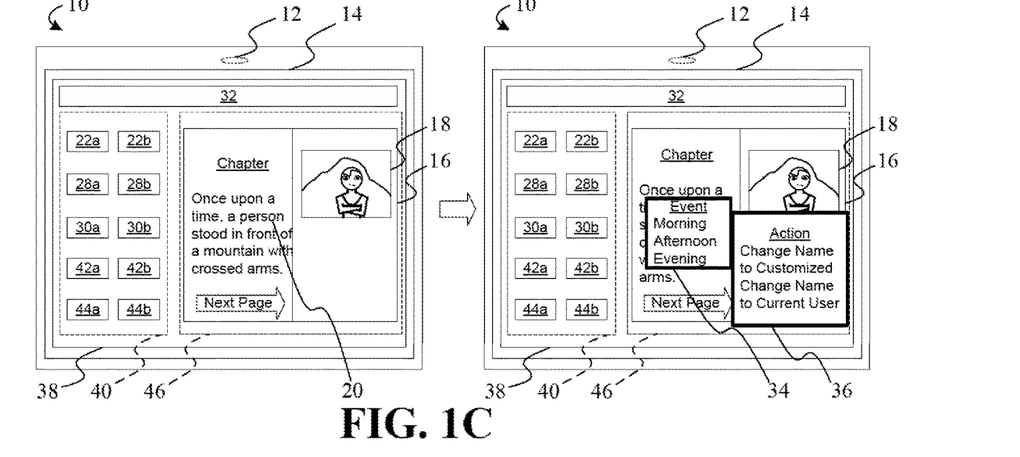

FIGS. 1A to 1C show an apparatus 10 to create media content according to an embodiment. In the illustrated example of FIGS. 1A to 1C, the apparatus 10 may include any computing device and/or data platform such as a laptop, personal digital assistant (PDA), wireless smart phone, media content player, imaging device, mobile Internet device (MID), any smart device such as a smart phone, smart tablet, smart TV, computer server, and so on, or any combination thereof. The illustrated apparatus 10 includes an image capture device 12, which may include an integrated camera of a computing device, a front-facing camera, a rear-facing camera, a rotating camera, a two-dimensional (2D) camera, a three-dimensional (3D) camera, a standalone camera (e.g., a wall mounted camera), and so on, or combinations thereof. The illustrated apparatus 10 also includes a display 14, which may include a touch screen display, an integrated display of a computing device, a rotating display, a 2D display, a 3D display, a standalone display (e.g., a projector screen), and so on, or combinations thereof.

The illustrated apparatus 10 creates content, such as media content 16. The media content 16 may include any data format. For example, the media content 16 may include a word processing document, a presentation document, a spreadsheet document, a web page, a video, a movie, a still image, a two-dimensional representation, a three-dimensional representation, an augmented reality representation, and so on, or combinations thereof. In addition, the media content 16 may include any publication format, such as an electronic book (e-book), an electronic advertisement, an electronic game, an electronic message (e.g., an electronic mail message, an instant message, a chat, a post, a electronic card, etc.), and so on, or combinations thereof. The media content 16 may be created using a template provided via a property component and/or a menu bar, described below. In the illustrated example, the media content 16 includes an e-book publication format.

The media content 16 may include one or more media objects 18, 20, which may also include any data format and/or publication format. In one example, the media objects 18, 20 may include a letter, a word, a sentence, a paragraph, a character (e.g., a symbol, a digit, a caricature, etc.), a landmark (e.g., a building, a mountain, etc.), a scene (e.g., a collection of media objects), a still image, a video, a 2D representation, a 3D representation, an augmented reality (AR) representation, the content as a whole (e.g., the entire content), and so on, or combinations thereof. The media objects 18, 20 may be added to the content from any location. For example, the media objects 18, 20 may be obtained from data memory, data storage, a data server, and so on, or combinations thereof. The media objects 18, 20 may be added from a data source that is on- or off-platform, on- or off-site relative to the apparatus 10, and so on, or combinations thereof. In the illustrated example, the media object 18 includes a video added to the media content 16 from data storage (not shown).

It should be understood that any media object may be created directly in the media content 16. For example, text appearing in the media content 16 may be generated in the media content 16 (e.g., in real time), such as when the media object 20 is generated directly in the media content 16. In addition, it should be understood that any media object in the media content 16 may include a functional property. The functional property may include, for example, a typeface property, an emphasis property (e.g., bold font weight, etc.), a color property, a playback property, and so on, or combinations thereof. The functional property may be automatically defined, and/or may be adjusted by a user (e.g., a content creator, a developer, etc.) at any time. In one example, the user may adjust the functional property when content is created, when a media object is added to the content, and so on, or combinations thereof. In the illustrated example, the display 14 renders the media object 18 which automatically includes a playback property, and renders the media object 20 which automatically includes a typeface property.

The apparatus 10 may communicate, and/or be integrated, with a component module to add one or more property components 22a, 22b to the media object 16. In one example, the property components 22a, 22b may impart a perceptual property and/or a contextual property to the media object 16. For example, the property components 22a, 22b may impart a user gesture property, a user feature property, a user attentiveness property, a user keyword property, a user distance property, a user number property, a user preference property, an environmental property, a motion property, a location property, a temporal property, and so on, or combinations thereof. Accordingly, the property components 22a, 22b may account for a user state (e.g., attention, interest, emotion, intent, etc.) and/or a content utilization context (e.g., environment, preferences, weather, etc.). It should be understood that the property components 22a, 22b may include a general property component having all of the properties and/or may include a specific property component having one or more of the properties.

The user gesture property may include an appendage gesture property for a recipient of the media content 16 (e.g., to recognize a hand gesture, a finger gesture, an arm gesture, etc.), a facial gesture property for the recipient (e.g., to recognize a smile gesture, frown gesture, surprise gesture, confusion gesture, etc.) and so on, or combinations thereof. The user feature property may include a facial recognition property for the recipient (e.g., to recognize an identity), an authorship property for a developer of the media content 16 (e.g., to recognize a relationship between the developer and the recipient), a gender property for the recipient (e.g., to recognize gender), and so on, or combinations thereof. The user attentiveness property may include a user gaze property for the recipient (e.g., to recognize interest, to recognize if viewing, to recognize if finished viewing, etc.), a user interaction property for the recipient (e.g., to recognize intent, to recognize interest, to recognize if finished viewing, etc.), a user point property (e.g., to recognize a finger point, to recognize a point with a handheld implement, etc.) and so on, or combinations thereof.

The user keyword property may include a spoken keyword property for the recipient (e.g., to recognize a spoken keyword), a sign language keyword property for the recipient (e.g., to recognize a body language keyword), and so on, or combinations thereof. The user distance property may include a viewing distance property for the recipient (e.g., to recognize a distance from a display), a listening distance property for the recipient (e.g., to recognize a distance from a speaker), and so on, or combinations thereof. The user number property may include a total number of recipients property (e.g., to recognize a total number of recipients), an adult and/or child number of recipients property (e.g., to recognize the presence of an adult and/or a child, the number thereof, etc.), and so on, or combinations thereof. The user preference property may include a display preference property for the recipient (e.g., to recognize preferred typeface, color, playback, etc.), an audio preference property for the recipient (e.g., if audio, volume level, etc.), and so on, or combinations thereof.

The environmental property may include a threshold noise property for the recipient environment (e.g., a threshold for background noise), a noise recognition property for the recipient environment (e.g., to recognize an environment type), a weather property for the recipient environment (e.g., to recognize a climate) and so on, or combinations thereof. The motion property may include an acceleration property for the recipient (e.g., to recognize acceleration of an apparatus), a gyration property for the recipient (e.g., to recognize a gyration of the apparatus), and so on, or combinations thereof. The location property may include a geographic location property for the recipient (e.g., to recognize a geospatial location), a commuting property for the recipient (e.g., to recognize if traveling), a work location property for the recipient (e.g., to recognize if at a work location), a leisure location property (e.g., to recognize if at a home location, on vacation, etc.), and so on, or combinations thereof. The temporal property may include a time zone property for the recipient (e.g., to recognize a time zone), a time of day property for the recipient (e.g., to recognize morning, afternoon, evening, etc.), and so on, or combinations thereof.

The apparatus 10 may communicate, and/or be integrated, with a binding module to map an event 24 corresponding to the property component 22a with an action 26 for the media objects 18. It is noted that the developer may perform an operation to add the property component 22a, the event 24, and/or the action 26 in any manner. In one example, the component module may add the property component 22a responsive to an operation by the developer that is independent of a direct access by the developer to computer source code for the media content 16, the media object 18, and so on, or combinations thereof. In another example, the binding module may map the event 24 with the action 26 responsive to an operation by the developer that is independent of a direct access by the user to the computer source code for the media content 16, the media object 18, and so on, or combinations thereof. Accordingly, the developer may not require any customization and/or programming knowledge since there may not be any need for the developer to directly write, debug, compile, etc. computer source code.

The property component 22a may, for example, be added to the media object 18 by the component module responsive to a drag-and-drop operation, a click operation, menu-based operation, a speech-activated operation, a touch screen operation, and so on, or combinations thereof. In addition, the binding module may map the event 24 with the action 26 responsive to a drag-and-drop operation, a click operation, menu-based operation, a speech-activated operation, a touch screen operation, and so on, or combinations thereof. In one example, a pop-up window may provide a list of all property components when a general property component is added to the media objects 18, 20. A pop-up window may provide a list of all properties when a specific property component is selected and/or is added to the media objects 18, 20. A pop-up window may provide a list of events when a property component and/or a property is selected, and/or when event components 28a, 28b are added to the media objects 18, 20. A pop-up window may provide a list of actions when a property component, a property, and/or an event is selected, and/or when action components 30a, 30b are added to the media object 18, 20. In addition, a menu operation at a menu bar 32 may provide a list, a click operation at the media objects 18, 20 may provide a list, a touch screen operation at the media objects 18, 20 may provide a list, a speech-activated operation at the media objects 18, 20 may provide a list, and so on, or combinations thereof.

In the illustrated example of FIG. 1B, the developer performs a drag-and-drop operation using the property component 22a, which causes the component module to add the property component 22a to the media object 18. In addition, the event 24 and the action 26 appear automatically to the developer (e.g., as a pop-up window) when the property component 22a is added to the media object 18. The developer may select the event 24 (e.g., one or more of the events from the list) and/or the action 26 (e.g., one or more of the actions from the list), which causes the binding module to map the selected event 24 with the selected action 26. For example, the developer may perform a drag-and-drop operation using the property component 22a to impart a user attentiveness perceptual property to the media object 18, which includes the user gaze property having a corresponding gaze event. The developer may select the event 24 (e.g., gaze event). In addition, the developer may select the action 26, which may be specific and/or nonspecific to the functional capabilities of the media object 18. For example, when the media object 18 includes a video format, the developer may select the action 26 to start video, hide video, show video, and/or change video, etc., in response to the event 24 (e.g., recipient gazing) when the media content 16 is utilized. Accordingly, the media object 18 may be modified based on the action 26 in response to the event 24 when media content 16 is utilized.

In the illustrated example of FIG. 1C, the developer performs an operation independent of direct access to computer source code, which causes the component module to add a temporal property including a time of day contextual property to the media object 20 (e.g., the word "person"). In addition, the event 34 and the action 36 appear automatically to the developer (e.g., as a pop-up window) when the time of day contextual property is imparted to the media object 32. The developer may select the event 34 (e.g., one or more of the events from the list) and/or the action 36 (e.g., one or more of the actions from the list), which causes the binding module to map the selected event 34 with the selected action 36. For example, the developer may select the event 34 (e.g., morning). In addition, the developer may select the action 36, which may be specific and/or nonspecific to the functional capabilities of the media object 18. When the media object 20 includes a text format, for example, the developer may select the action 36 to change the text "person" to a customized name, change the text "person" to the name of the current user, etc., in response to the event 34 (e.g., morning) when the media content 16 is utilized. Accordingly, the media object 20 may be modified based on the action 36 in response to the event 34 when media content 16 is utilized.

It should be understood that multiple properties may be added to a single media object to impart the desired perceptual property and/or contextual property. Extending the illustrated example of FIG. 1C, the developer may perform an operation independent of a direct access to computer source code, which causes the component module to add to the media object 20 the user feature property including the facial recognition property and/or the authorship property. In one example, the media object 20 may change from "person" to the name of the current user based on the action 36 in response to the event 34 when the media object 20 also includes the facial recognition perceptual property (in addition to the time of day contextual property) to recognize the identity of the recipient that is utilizing the media content 16. Accordingly, the text "person" may change in the morning to the name of the current user. In addition, the media object 20 may change from "person" to a customized name based on the action 36 in response to the event 34 when the text "person" also includes the authorship perceptual property (in addition to the time of day contextual property and the facial recognition property) to recognize a relationship between the developer and the recipient that is utilizing the media content 16. Accordingly, the text "person" may change in the morning to a customized name of the developer's child if the child is utilizing the media content 16, the text "person" may change in the morning to a customized name of the developer's spouse if the spouse is utilizing the media content 16, and so on, or combinations thereof.

The apparatus 10 may communicate, and/or be integrated, with a user interface module to render a graphical user interface 38. The graphical user interface 38 may include a content creation development tool. In one example, the graphical user interface 38 may include a component area 40 to provide the perceptual property, the contextual property, the event, and/or the action. In the illustrated example, the component area includes the property components 22a, 22b to provide the perceptual property and/or the contextual property, the event components 28a, 28b to provide the event, and/or the action components 30a, 30b to provide the action.

In addition, the component area 40 includes one or more customization components 42a, 42b to provide a custom configuration of the perceptual property, the contextual property, the event, and/or the action. In one example, the custom configuration may include a combination of properties, events, and/or actions defined by the developer, defined by another user as standard configurations, and so on, or combinations thereof. In addition, the component area 40 includes one or more template components 44a, 44b to provide a template for a project type. The template components 40a, 40b may, for example, provide a template for an e-book, a e-card, a web page, a presentation, and so on, or combinations thereof. The template may be defined by the developer, defined by another user as a standard template, and so on, or combinations thereof. It should be understood that the properties, events, and/or actions may also be provided via any other area of the graphical user interface 38, such as by the menu bar 32 which may be included in the graphical user interface 38.

The graphical user interface 38 may include a media canvas area 46 to adjust the media objects 18, 20 with the perceptual property, the contextual property, the event, and/or the action. The graphical user interface module may add the media objects 18, 20 to the media content 16 disposed in the media canvas area 46. The graphical user interface module may include a graphical interface operation module to cause a graphical user interface operation to be implemented to create the media content 16. For example, the graphical user interface operation module may provide, and/or cause the graphical user interface 38 to implement, a drag-and-drop operation, a click operation, menu-based operation, a speech-activated operation, a touch screen operation, and so on, or combinations thereof. In addition, the graphical user interface module may include a selection feature module to cause a selection of the perceptual property, the contextual property, the event, and/or the action to create the media content 16. For example, the selection feature module may provide, and/or cause the graphical user interface 38 to implement, a selection via a drag-and-drop feature, a pop-up window feature, a menu feature, a click feature, and so on, or combinations thereof.

The graphical user interface module may also include a customization feature module to cause a customization of the perceptual property, the contextual property, the event, and/or the action to create the media content 16. For example, the customization feature module may provide, and/or cause the graphical user interface 38 to implement, a customization of a customization component (e.g., a hybrid property-event-action component) via a drag-and-drop feature, a pop-up window feature, a menu feature, a click feature, and so on, or combinations thereof. The graphical user interface module may include a template module to cause a template to be implemented to create the media content 16. For example, the template module may provide, and/or cause the graphical user interface 38 to implement, a template for a project type to create the media content 16 via a drag-and-drop feature, a pop-up window feature, a menu feature, a click feature, and so on, or combinations thereof.

Figure 2:
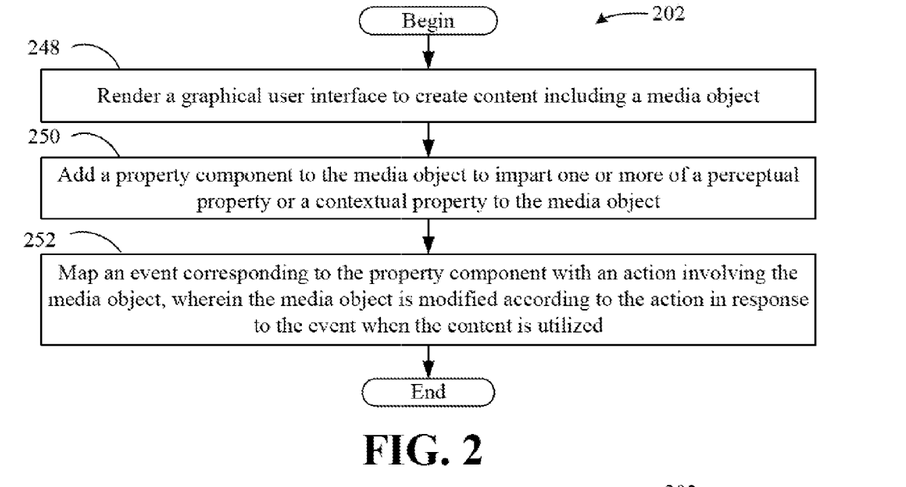
FIGS. 2 and 3 are flowcharts of examples of methods to create media content according to embodiments.

Turning now to FIG. 2, a method 202 is shown to facilitate image processing according to an embodiment. The method 202 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 202 may be written in any combination of one or more programming languages, including an object oriented programming language such as C++ or the like and conventional procedural programming languages, such as the "C" programming language or similar programming languages. Moreover, the method 202 may be implemented using any of the herein mentioned circuit technologies.

Illustrated processing block 248 provides for rendering a graphical user interface to create content. The content may include any data format, such as a word processing document, a presentation document, a spreadsheet document, a web page, a video, a movie, a still image, a 2D representation, a 3D representation, an AR representation, and so on, or combinations thereof. The content may include any publication format, such as such as an electronic book (e-book), an electronic advertisement, an electronic game, an electronic message (e.g., an electronic mail message, an instant message, a chat, a post, a electronic card, etc.), and so on, or combinations thereof.

The content may include a media object, which may also include any data format and/or publication format. In one example, the media object may include a letter, a word, a sentence, a paragraph, a character (e.g., a symbol, a digit, a caricature, etc.), a landmark (e.g., a building, a mountain, etc.), a scene (e.g., a collection of objects), a still image, a video, a 2D representation, a 3D representation, an AR representation, the content as a whole (e.g., the entire content), and so on, or combinations thereof. The media object may be added to the content from any location, such as from data memory, data storage, a data server, and so on, or combinations thereof. The media object may be added from a data source that is on- or off-platform, on- or off-site, and so on, or combinations thereof. For example, a 3D media object may be developed using a 3D tool and loaded (e.g., to a media canvas), may be scanned using an image capture device to generate a 3D model and loaded, and so on, or combinations thereof. The media object may also be created directly in the content, such as text that is generated in the content.

Rendering the graphical user interface may include rendering a component area to provide a perceptual property, a contextual property, an event, and/or an action. In one example, the component area may include a property component to provide the perceptual property and/or the contextual property, an event component to provide the event, and/or an action component to provide the action. The component area may also include a customization component to provide a custom configuration of the perceptual property, the contextual property, the event, and/or the action. In addition, the component area may include a template component to provide a template for a project type. Rendering the graphical user interface may also include rendering a media canvas area to adjust the media object with the perceptual property, the contextual property, the event, and/or the action.

Illustrated processing block 250 provides for adding a property component to the media object to impart a perceptual property and/or a contextual property to the media object. A developer may perform an operation to add the component to the media object in any manner. For example, the developer may use a graphical user interface operation to add the component to the media object. The graphical user interface operation may include a drag-and-drop operation, a click operation, menu-based operation, a speech-activated operation, and/or a touch screen operation.

The property component may impart a user gesture property, a user feature property, a user attentiveness property, a user keyword property, a user distance property, a user number property, a user preference property, an environmental property, a motion property, a location property, a temporal property, and so on, or combinations thereof. Accordingly, the property component may account for a user state (e.g., attention, interest, emotion, intent, etc.) and/or a content utilization context (e.g., environment, preferences, weather, etc.). The property component may include a general property component having all of the properties and/or may include a specific property component having one or more of the properties.

Illustrated processing block 252 provides for mapping an event corresponding to the property component with an action for the media object, wherein the media object is modified based on the action in response to the event when content created including the media object is utilized. The developer may perform an operation to add the event to the media object, to add the action to the media object, and/or to map the event with the action in any manner. For example, the developer may use a graphical user interface operation to add the event and the action to the media object, and/or to map the event with the action.

In addition, a selection feature may be provided and/or implemented via the graphical user interface to cause a selection of the perceptual property, the contextual property, the event, and/or the action to create the content. Moreover, a customization feature may be provided and/or implemented via the graphical user interface to cause a customization of the perceptual property, the contextual property, the event, and/or the action to create the content. A template may be provided and/or implemented to create the content. The components, properties, events, actions, custom configurations, and/or templates may be stored in a data store at any location. Accordingly, the media object may be modified based on the action in response to the event when content created including the media object is utilized.

Figure 3:
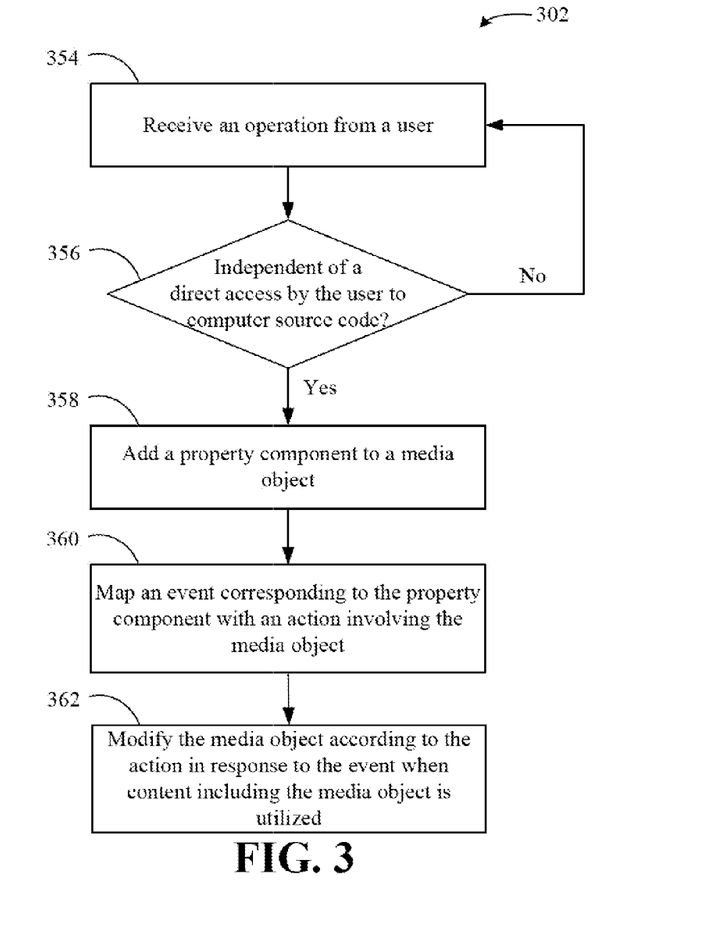

FIG. 3 shows a flow of a method 302 to generate content according to an embodiment. The method 302 may be implemented using any of the herein mentioned technologies. Illustrated processing block 354 receives an operation from a user (e.g., a developer). A determination may be made at block 356 if the operation is independent of a direct access by the user to computer source code. In one example, the determination may include identifying if the user accesses and/or directly writes program code to the computer source code (e.g., adding, deleting, altering, etc.). If the operation is not independent of a direct access to the computer source code, the process may proceed back to the processing block 354.

If the operation is independent of a direct access to the computer source code, the illustrated processing block 358 adds a property component to a media object to impart a perceptual property and/or a contextual property to the media object. For example, a developer may perform a drag-and-drop operation using a property component to cause the processing block 358 to add the property component to the media object and impart a perceptual property (e.g., a gaze property, a facial recognition property, etc.) and/or a contextual property (e.g., geographic location property, etc.). Thus, the addition at the illustrated processing block 358 may be responsive to the operation by the user that is independent of the direct access by the user to the computer source code. In addition, the illustrated processing block 360 maps an event corresponding to the property component with an action for the media object. For example, the developer may select the event (e.g., one or more of the events from a list) and/or the action (e.g., one or more of the actions from a list), which causes the processing block 360 to map the selected event (e.g., gaze) with the selected action (e.g., play video). Thus, the mapping at the processing block 360 may be responsive to the operation by the user that is independent of the direct access by the user to the computer source code.

The illustrated processing block 362 modifies (e.g., changes) the media object based on the action in response to the event when media content is utilized. For example, if the media object includes the entire content and the content includes an e-card, the e-card may behave differently depending on which recipient utilizes (e.g., receives and launches) the e-card when the event is encountered. In one example, the gaze property and the facial recognition property for the e-card may cause the e-card to change according to the selected action (e.g., begin playing a video, audio, etc.) for the particular recipient (e.g., play a recipient-specific video) when the event (e.g., recipient gazing) is encountered. In another example, the geographic location property may further drive the change according to the particular location where the recipient views the e-card (e.g., provide one video when the recipient is in one location and another video for all other locations, provide a specified video for each specified location for each specified recipient, etc.).

Figure 4:
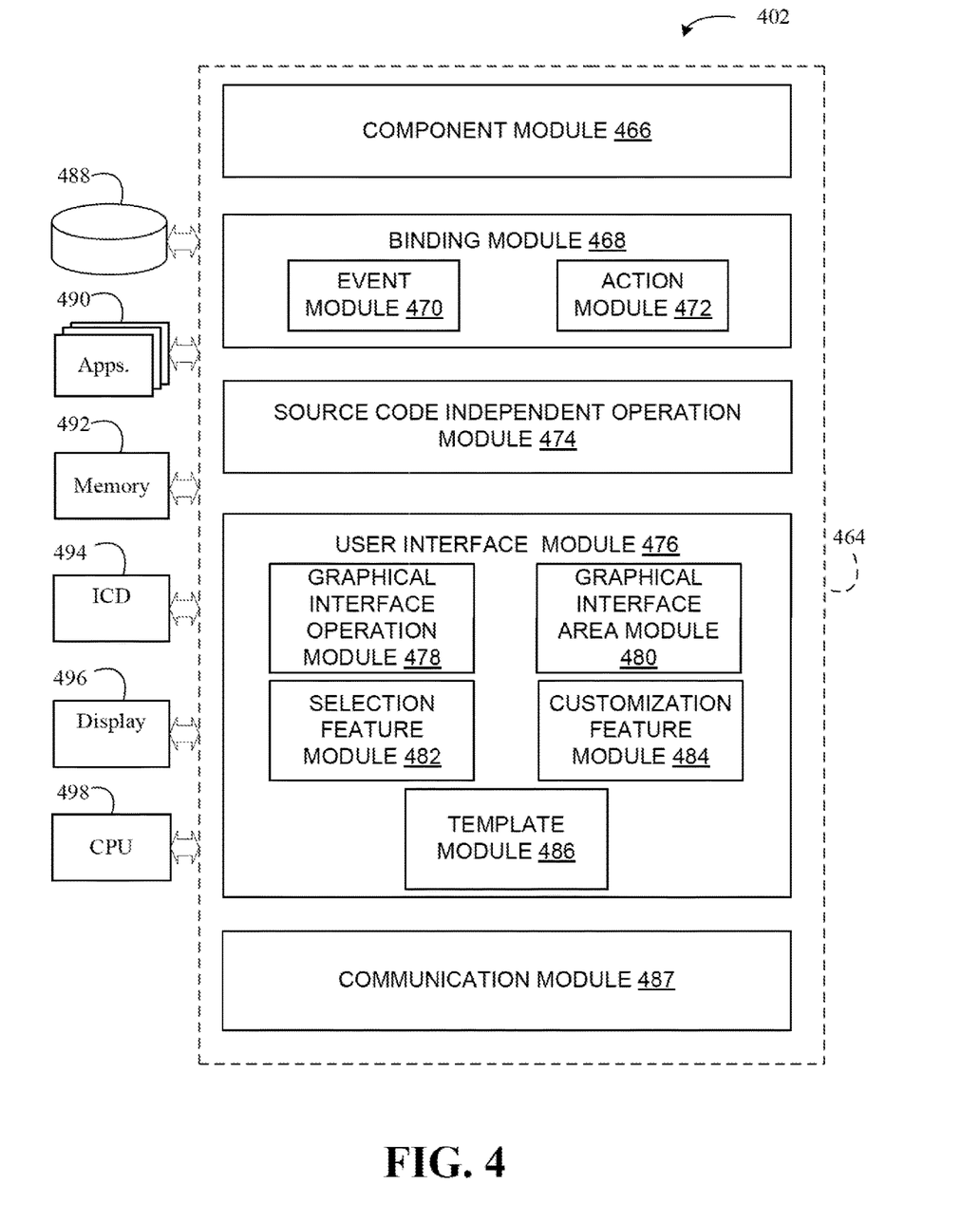
FIG. 4 is a block diagram of an example of a logic architecture according to an embodiment.

Turning now to FIG. 4, an apparatus 402 is shown including logic 464 to create content according to an embodiment. The logic architecture 464 may be generally incorporated into a platform such as such as a laptop, personal digital assistant (PDA), wireless smart phone, media player, imaging device, mobile Internet device (MID), any smart device such as a smart phone, smart tablet, smart TV, computer server, and so on, or combinations thereof. The logic architecture 464 may be implemented in an application, operating system, media framework, hardware, and so on, or combinations thereof. The logic architecture 464 may be implemented in any part of a content creation pipeline, such as a network interface card, memory, processor, hard drive, operating system, application, and so on, or combinations thereof. For example, the logic architecture 464 may be implemented in a processor, such as a central processing unit (CPU), a graphical processing unit (GPU), a visual processing unit (VPU), a sensor, an operating system, an application, and so on, or combinations thereof. The apparatus 402 may include, and/or interact with, storage 488, applications 490, memory 492, an image capture device 494, display 496, CPU 498, and so on, or combinations thereof.

In the illustrated example, the logic architecture 464 includes a component module 466. The component module 466 may provide, and/or add, a property component to impart a perceptual property and/or a contextual property to the media object. In addition, the component module 466 may provide, and/or add, an event component to impart an event to the media object. The component module 466 may also provide, and/or add, an action component to impart an action to the media object. The component module 466 may provide, and/or add, a customization component to impart a custom configuration to the media object. The component module 466 may provide, and/or add, a template component create the content. The component module may provide any component to any location, such as to an application, to a graphical user interface, a menu, to data storage, etc., and in any form, such as a database, a list, a tab, so on, or combinations thereof.

Additionally, the illustrated logic architecture 464 includes a binding module 468. In the illustrated example, the binding module 468 includes an event module 470 to identify and/or implement an event corresponding to the property component. In addition, the binding module 468 includes an action module 472 to identify and/or implement an action for the media object. In one example, the binding module 468 may map the event corresponding to the property component with the action for the media object.

Additionally, the illustrated logic architecture 464 includes a source code independent operation module 474. The source code independent operation module 474 may identify and/or implement an operation by a user (e.g., a developer) that is independent of a direct access by the user to computer source code. In one example, the source code independent operation module 474 may identify if the operation does not involve directly writing program code to the computer source code (e.g., adding, deleting, altering, etc.). In addition, the source code independent operation module 474 may implement the operation that does not involve directly writing program code to the computer source code.

Additionally, the illustrated logic architecture 464 includes a user interface module 472. The user interface module 464 may provide any desired interface, such as a graphical user interface, a command line interface, and so on, or combinations thereof. The user interface module 464 may provide access to one or more settings associated with facilitating image processing.

The settings may include options to define, for example, content (e.g., data format, publication format, etc.), media objects (e.g., data format, publication format, etc.), property components (e.g., general, specific, etc.), properties (e.g., user gesture property, user feature property, etc.), events (e.g., components, wave, thumbs up, far, close, home, work, smile, frown, sunny, snowing, etc.), actions (e.g., components, begin playing, stop playing, replace video, hide text, etc.), a display (e.g., mobile platform, etc.), an image capture device (e.g., resolution, which device to use, etc.), customization features (e.g., components, pop-up window, menu-based, etc.), selection features (e.g., highlight, pop-up window, menu-based, etc.), templates (e.g., components, user defined, standard, project type, etc.), operations (e.g., drag-and-drop, menu-based, etc.), communication and/or storage parameters (e.g., which data to store, where to store the data, which data to communicate, etc.). The settings may include automatic settings (e.g., automatically provide components, events, actions, etc.), manual settings (e.g., request the user to manually select and/or confirm implementation of property components, etc.), and so on, or combinations thereof.

The illustrated user interface module 476 may render a graphical user interface. In the illustrated example, the user interface module 476 includes a graphical interface operation module 478 to cause a graphical user interface operation to be implemented to create the media content. For example, the graphical user interface operation module may provide, and/or cause the graphical user interface to implement, a drag-and-drop operation, a click operation, menu-based operation, a speech-activated operation, and/or a touch screen operation.

In the illustrated example, the user interface module 476 includes a graphical interface area module 480. In one example, the graphical interface area module 480 may provide, and/or render, a component area via the graphical user interface to provide the perceptual property, the contextual property, the event, and/or the action to create the media content. In addition, graphical interface area module 480 may provide, and/or render, a media canvas area via the graphical user interface to adjust the media object with the perceptual property, the contextual property, the event, and/or the action.

In the illustrated example, the user interface module 476 includes a selection feature module 482 to cause a selection of the perceptual property, the contextual property, the event, and/or the action to create the media content. For example, the selection feature module may provide, and/or cause the graphical user interface to implement, a selection via a drag-and-drop feature, a pop-up window feature, a menu feature, a click feature, and so on, or combinations thereof.

In the illustrated example, the user interface module 476 includes a customization feature module 484 to cause a customization of the perceptual property, the contextual property, the event, and/or the action to create the media content. For example, the customization feature module may provide, and/or cause the graphical user interface to implement, a customization via a drag-and-drop feature, a pop-up window feature, a menu feature, a click feature, and so on, or combinations thereof.

In the illustrated example, the user interface module 476 includes a template module 486 to cause a template to be implemented to create the media content. For example, the template module may provide, and/or cause the graphical user interface to implement, a template for a project type to create the media content via a drag-and-drop feature, a pop-up window feature, a menu feature, a click feature, and so on, or combinations thereof.

Additionally, the illustrated logic architecture 464 includes a communication module 487. The communication module 487 may be in communication, and/or integrated, with a network interface to provide a wide variety of communication functionality, such as cellular telephone (e.g., W-CDMA (UMTS), CDMA2000 (IS-856/IS-2000), etc.), WiFi, Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes. The communication module 487 may communicate any data associated with creating content, including components, properties, events, actions, templates, and so on, or combinations thereof.

Additionally, any data associated with creating content may be stored in the storage 488, may be displayed via the applications 490, may be stored in the memory 492, may be captured via the image capture device 494, may be displayed in the display 496, and/or may be implemented via the CPU 498. For example, component data (e.g., property components, event components, action components, customization components, template components, etc.), properties (e.g., user gesture property, etc.), events (e.g., point, etc.), actions (e.g., play audio, etc.), and/or the communication data (e.g., communication settings, etc.) may be captured, stored, displayed, and/or implemented using the storage 488, the applications 490, the memory 492, the image capture device 494, the display 496, the CPU 498, and so on, or combinations thereof.

While examples have shown separate modules for illustration purposes, it is should be understood that one or more of the modules of the logic architecture 464 may be implemented in one or more combined modules, such as a single module including one or more of the component module 466, the binding module 468 (and/or modules thereof), the source code independent operation module 474, the user interface module 476 (and/or modules thereof), and/or the communication module 487. In addition, it should be understood that one or more logic components of the apparatus 402 may be on-platform, off-platform, and/or reside in the same or different real and/or virtual space as the apparatus 402. For example, component module 466 may reside in a computing cloud environment on a server while one or more of the other modules of the logic architecture 464 may reside on a computing platform where the user is physically located, and vice versa, or combinations thereof. Accordingly, the modules may be functionally separate modules, processes, and/or threads, may run on the same computing device and/or distributed across multiple devices to run concurrently, simultaneously, in parallel, and/or sequentially, may be combined into one or more independent logic blocks or executables, and/or are described as separate components for ease of illustration.

Figure 5:
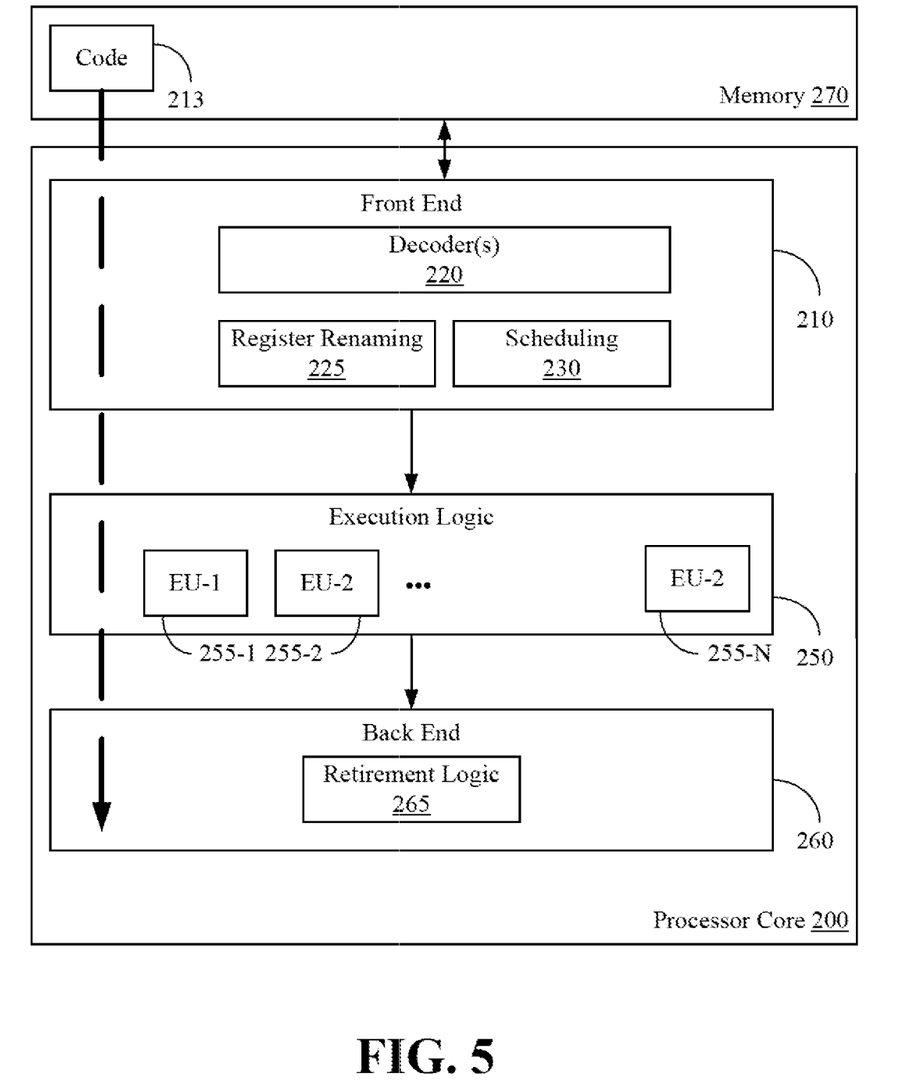
FIG. 5 is a block diagram of an example of a processor according to an embodiment.

Turning now to FIG. 5, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 464 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
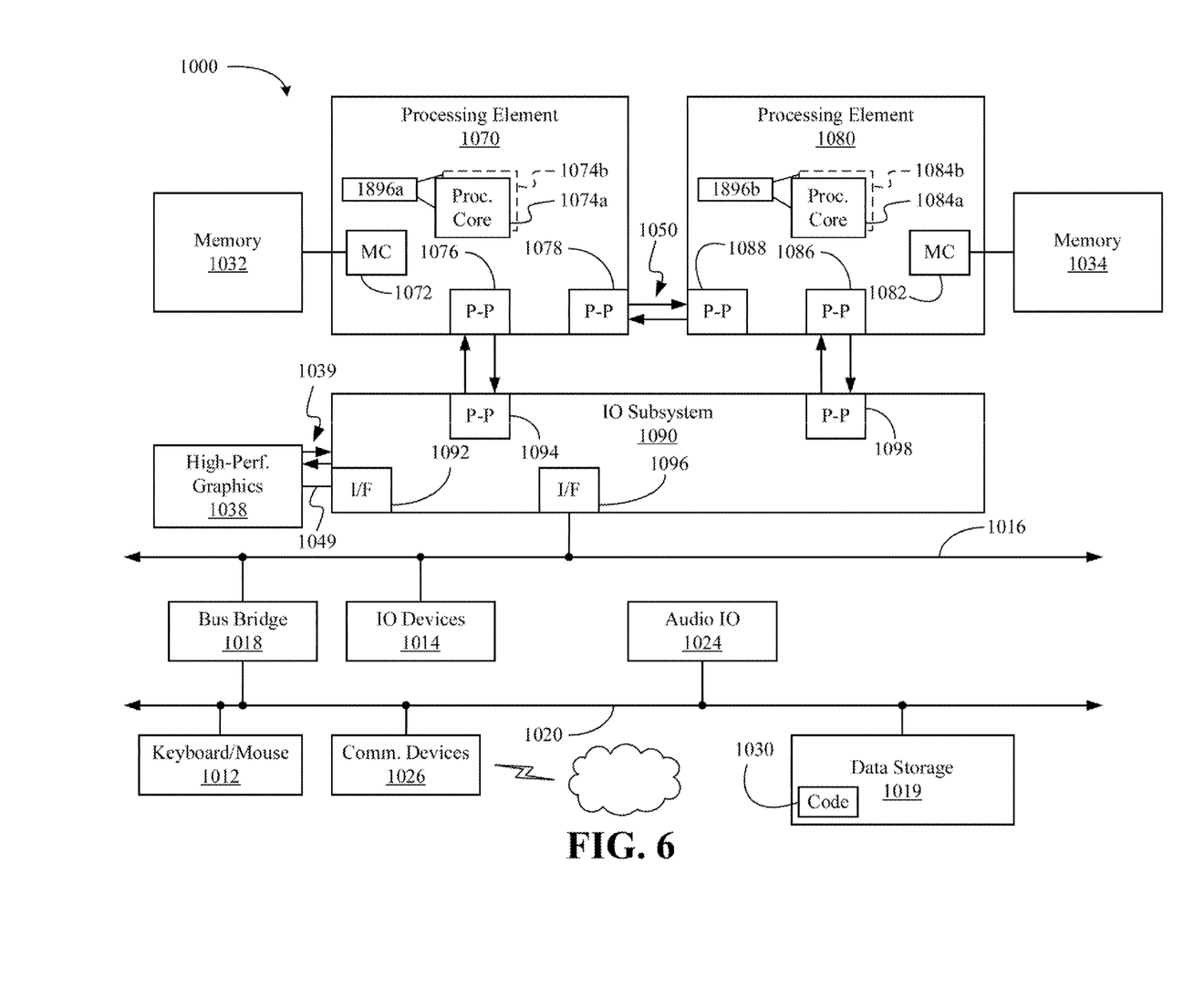
FIG. 6 is a block diagram of an example of a system according to an embodiment.

FIG. 6 shows a block diagram of a system 1000 in accordance with an embodiment. Shown in FIG. 6 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074, 1074b, 1084a. 1084b may be configured to execute instruction code in a manner similar to that discussed above in connection with FIG. 5.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a peripheral Component Interconnect (PCI) bus, or a bus such as a PCI Express bus or another third generation I/O interconnect bus, although the scope is not so limited.

As shown in FIG. 6, various I/O devices 1014 such as the display 14 (FIG. 1) and/or the display 496 (FIG. 4) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the logic architecture 464 (FIG. 4), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Examples may include subject matter such as a method, means for performing acts of the method, at least one machine-readable medium including instructions that, when performed by a machine cause the machine to performs acts of the method, or an apparatus or system to create content according to embodiments and examples described herein.

Example 1 is as an apparatus to create content, comprising a display to render a media object, a component module to add a property component to the media object to impart one or more of a perceptual property or a contextual property to the media object, and a binding module to map an event corresponding to the property component with an action for the media object, wherein the media object is to be modified based on the action in response to the event when content created including the media object is utilized.

Example 2 includes the subject matter of Example 1 and further optionally includes the component module to add the property component responsive to an operation by a user that is to be independent of a direct access by the user to computer source code.

Example 3 includes the subject matter of any of Example 1 to Example 2 and further optionally includes the binding module to map the event with the action responsive to an operation by a user that is to be independent of a direct access by the user to computer source code.

Example 4 includes the subject matter of any of Example 1 to Example 3 and further optionally includes a user interface module to render a graphical user interface to create the content.

Example 5 includes the subject matter of any of Example 1 to Example 4 and further optionally includes the graphical user interface module to include one or more of a graphical interface operation module to cause a graphical user interface operation to be implemented to create the content, a selection feature module to cause a selection of one or more of the property, the event, or the action to create the content, a customization feature module to cause a customization of one or more of the property, the event, or the action to create the content, or a template module to cause a template to be implemented to create the content.

Example 6 is a computer-implemented method to create content, comprising adding a property component to a media object to impart one or more of a perceptual property or a contextual property to the media object, and mapping an event corresponding to the property component with an action for the media object, wherein the media object is modified based on the action in response to the event when content created including the media object is utilized.

Example 7 includes the subject matter of Example 6 and further optionally includes the media object including one or more of a letter, a word, a sentence, a paragraph, a character, a landmark, a scene, a still image, a video, a two-dimensional representation, a three-dimensional representation, an augmented reality representation, or the content as a whole, and the content including one or more of an electronic book, an electronic advertisement, an electronic game, or an electronic message.

Example 8 includes the subject matter of any of Example 6 to Example 7 and further optionally includes the property component to account for one or more of a user state or a content utilization context.

Example 9 includes the subject matter of any of Example 6 to Example 8 and further optionally includes the property component imparting one or more of a user gesture property, a user feature property, a user attentiveness property, a user keyword property, a user distance property, a user number property, a user preference property, an environmental property, a motion property, a location property, or a temporal property.

Example 10 includes the subject matter of any of Example 6 to Example 9 and further optionally includes one or more of adding the property component responsive to an operation by a user that is independent of a direct access by the user to computer source code, or mapping the event with the action responsive to an operation by a user that is independent of a direct access by the user to computer source code.

Example 11 includes the subject matter of any of Example 6 to Example 10 and further optionally includes the operation including a graphical interface operation including one or more of a drag-and-drop operation, a click operation, menu-based operation, a speech-activated operation, or a touch screen operation.

Example 12 includes the subject matter of any of Example 6 to Example 11 and further optionally includes rendering a graphical user interface to create the content.

Example 13 includes the subject matter of any of Example 6 to Example 12 and further optionally includes one or more of rendering a component area via the graphical user interface to provide one or more of the property, the event, or the action, or rendering a media canvas area via the graphical user interface to adjust the media object with the property, the event, or the action.

Example 14 includes the subject matter of any of Example 6 to Example 13 and further optionally includes providing a template for the content.

Example 15 includes the subject matter of any of Example 6 to Example 14 and further optionally includes one or more of providing a selection feature via the graphical user interface to cause a selection of one or more of the property, the event, or the action to create the content, or providing a customization feature via the graphical user interface to cause a customization of one or more of the property, the event, or the action to create the content.

Example 16 includes the subject matter of any of Example 6 to Example 15 and further optionally includes storing a custom configuration including one or more of the property, the event, or the action.

Example 17 is at least one computer-readable medium including one or more instructions that when executed on one or more computing devices causes the one or more computing devices to perform the method of any of Example 6 to Example 16.

Example 18 is an apparatus including means for performing the method of any of Example 6 to Example 16.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R). Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating." "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second". etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof the true scope of the embodiments should not be so limited since other modifications will become apparent to the skilled practitioner upon a study of the drawings, the specification, and following claims.

We claim:

1. An apparatus to create and deploy media content comprising:
   one or more processors;
   a display to render content that is to be created by a media creator, wherein the content is to include a media object positioned in a blank portion of a template for an e-book by the media creator via the display, wherein the media object includes one or more of a text media object including a text format or an image media object including an image format;
   a component module, implemented by the one or more processors, to add a property component to the media object directly responsive to a first operation via the display by the media creator involving the media object in the template that is to be independent of a direct access by the media creator to computer source code to impart one or more of a perceptual property or a contextual property to the media object, wherein the property component is to account for a state of a pre-defined content recipient and a content utilization context by the pre-defined content recipient;

a binding module, implemented by the one or more processors, to map an event that is to be defined by the media creator corresponding to the property component directly responsive to a second operation via the display by the media creator involving the media object in the template that is to be independent of a direct access by the media creator to computer source code with an action that is to be defined by the media creator for the media object directly responsive to a third operation via the display by the media creator involving the media object in the template that is to be independent of a direct access by the media creator to computer source code, wherein the first operation, the second operation, and the third operation includes one or more of a drag-and-drop operation, a click operation, a menu-based operation, a speech-activated operation, or a touch screen operation; and a communication module, implemented by the one or more processors, to provide the event and the action to a processor configured to:
dynamically modify the media object from a general default state to a temporary state specific to the pre-defined content recipient based on identification of the pre-defined content recipient and identification of the event, via implementation of the action, in response to utilization of the content by the pre-defined content recipient, and
dynamically modify the media object from the temporary state back to the general default state based on absence of the event, via absence of the action, to render the media object in the general default state to every content recipient that utilizes the content.

2. The apparatus of claim 1, further including a user interface module, implemented by the one or more processors, to render a graphical user interface to the media creator to create the content.

3. The apparatus of claim 2, wherein the graphical user interface module is to automatically provide a list of one or more of the property, the event, or the action to the media creator directly responsive to when the media object is added to the template.

4. The apparatus of claim 3, wherein the list is to be automatically provided to the media creator via a pop-up window.

5. The apparatus of claim 2, wherein the graphical user interface module is to include:
a graphical interface operation module, implemented by the one or more processors, to allow a graphical user interface operation to be implemented to add the text media object including the text format and the image media object including the image format to the template;
a selection feature module, implemented by the one or more processors, to allow a selection by the media creator of one or more of the property, the event, or the action to create the content; and
a customization feature module, implemented by the one or more processors, to allow a customization by the media creator of one or more of the property, the event, or the action to create the content.

6. The apparatus of claim 1, wherein the media object is to include the text media object having the text format in the e-book that is to be dynamically changed to display a name of the pre-defined content recipient.

7. The apparatus of claim 1, wherein the media object is to include the image media object including a video that is to provide a visual representation of text to be rendered concurrently with the video when the pre-defined content recipient gazes at the video.

8. A computer-implemented method to create and deploy media content comprising:
rendering via a display content that is created by a media creator, wherein the content is to include a media object positioned in a blank portion of a template for an e-book by the media creator via the display, wherein the media object includes one or more of a text media object including a text format or an image media object including an image format;
adding a property component to a media object directly responsive to a first operation via the display by the media creator involving the media object in the template that is independent of a direct access by the media creator to computer source code to impart one or more of a perceptual property or a contextual property to the media object, wherein the property component accounts for a state of a pre-defined content recipient and a content utilization context by the pre-defined content recipient;
mapping an event that is defined by the media creator corresponding to the property component directly responsive to a second operation via the display by the media creator involving the media object in the template that is to be independent of a direct access by the media creator to computer source code with an action that is defined by the media creator for the media object directly responsive to a third operation via the display by the media creator involving the media object in the template that is independent of a direct access by the media creator to computer source code, wherein the first operation, the second operation, and the third operation includes one or more of a drag-and-drop operation, a click operation, a menu-based operation, a speech-activated operation, or a touch screen operation; and
providing the event and the action to a processor configured to:
dynamically modify the media object from a general default state to a temporary state specific to the pre-defined content recipient based on identification of the pre-defined content recipient and identification of the event, via implementation of the action, in response to utilization of the content by the pre-defined content recipient; and
dynamically modify the media object from the temporary state back to the general default state based on absence of the event, via absence of the action, to render the media object in the general default state to every content recipient that utilizes the content.

9. The method of claim 8, wherein the media object includes one or more of a letter, a word, a sentence, a paragraph, a character, a landmark, a scene, a still image, a video, a two-dimensional representation, a three-dimensional representation, an augmented reality representation, or the content as a whole, and wherein the content includes one or more of an electronic advertisement, an electronic game, or an electronic message.

10. The method of claim 8, wherein the property component imparts one or more of a user gesture property, a user feature property, a user attentiveness property, a user keyword property, a user distance property, a user number property, a user preference property, an environmental property, a motion property, a location property, or a temporal property.

11. The method of claim 8, further including rendering a graphical user interface to the media creator to create the content.

12. The method of claim 11, further including:
rendering a component area via the graphical user interface to provide one or more of the property, the event, or the action to the media creator; and
rendering a media canvas area via the graphical user interface to present the template to the media creator, to allow an adjustment of the template with the media object, and to allow an adjustment of the media object with one or more of the property, the event, or the action.

13. The method of claim 11, further including one or more of:
providing a selection feature via the graphical user interface to allow a selection by the media creator of one or more of the property, the event, or the action to create the content; or
providing a customization feature via the graphical user interface to allow a customization by the media creator of one or more of the property, the event, or the action to create the content.

14. The method of claim 13, further including storing a custom configuration including one or more of the property, the event, or the action.

15. At least one non-transitory computer-readable medium comprising one or more instructions that when executed on a computing device cause the computing device to:
render via a display content that is to be created by a media creator, wherein the content is to include a media object positioned in a blank portion of a template for an e-book by the media creator via the display, wherein the media object includes one or more of a text media object including a text format or an image media object including an image format;
add a property component to a media object directly responsive to a first operation via the display by the media creator involving the media object in the template that is to be independent of a direct access by the media creator to computer source code to impart one or more of a perceptual property or a contextual property to the media object, wherein the property component is to account for a state of a pre-defined content recipient and a content utilization context by the pre-defined content recipient;
map an event that is to be defined by the media creator corresponding to the property component directly responsive to a second operation via the display by the media creator involving the media object in the template that is to be independent of a direct access by the media creator to computer source code with an action that is to be defined by the media creator for the media object directly responsive to a third operation via the display by the media creator involving the media object in the template that is to be independent of a direct access by the media creator to computer source code, wherein the first operation, the second operation, and the third operation includes one or more of a drag-and-drop operation, a click operation, a menu-based operation, a speech-activated operation, or a touch screen operation; and
provide the event and the action to a processor configured to:
dynamically modify the media object from a general default state to a temporary state specific to the pre-defined content recipient based on identification of the pre-defined content recipient and identification of the event, via implementation of the action, and in response to utilization of the content by the pre-defined content recipient; and
dynamically modify the media object from the temporary state back to the general default state based on absence of the event, via absence of the action, to render the media object in the general default state to every content recipient that utilizes the content.

16. The at least one medium of claim 15, wherein when executed the one or more instructions cause the computing device to render a graphical user interface to the media creator to create the content.

17. The at least one medium of claim 16, wherein when executed the one or more instructions cause the computing device to:
render a component area via the graphical user interface to provide one or more of the property, the event, or the action to the media creator; and
render a media canvas area via the graphical user interface to present the template to the media creator, to allow an adjustment of the template with the media object, and to allow an adjustment of the media object with one or more of the property, the event, or the action.

18. The at least one medium of claim 16, wherein when executed the one or more instructions cause the computing device to one or more of:
provide a selection feature via the graphical user interface to allow a selection by the media creator of one or more of the property, the event, or the action to create the content; or
provide a customization feature via the graphical user interface to allow a customization by the media creator of one or more of the property, the event, or the action to create the content.

19. The at least one medium of claim 18, wherein when executed the one or more instructions cause the computing device to store a custom configuration including one or more of the property, the event, or the action.

* * * * *